United States Patent
Peterson et al.

(10) Patent No.: US 7,832,208 B2
(45) Date of Patent: Nov. 16, 2010

(54) PROCESS FOR ELECTRO-HYDRAULIC CIRCUITS AND SYSTEMS INVOLVING EXCAVATOR BOOM-SWING POWER MANAGEMENT

(75) Inventors: Randy N Peterson, Peoria, IL (US); Todd Lawrence Baker, Brimfield, IL (US); Michael Todd Verkuilen, Metamora, IL (US); Aleksandar M Egelja, Naperville, IL (US); Tetsuya Yoshino, Akashi (JP)

(73) Assignees: Caterpillar Inc, Peoria, IL (US); Caterpillar Japan Ltd, Tokyo (JP)

( * ) Notice: Subject to any disclaimer, the term of this patent is extended or adjusted under 35 U.S.C. 154(b) by 410 days.

(21) Appl. No.: 11/939,028

(22) Filed: Nov. 13, 2007

(65) Prior Publication Data

US 2009/0120083 A1    May 14, 2009

(51) Int. Cl.
  *F15B 11/00*    (2006.01)
  *E02F 9/04*    (2006.01)
(52) U.S. Cl. ...................................................... 60/431
(58) Field of Classification Search .................. 60/431, 60/433, 434
  See application file for complete search history.

(56) References Cited

U.S. PATENT DOCUMENTS

| | | | |
|---|---|---|---|
| 4,697,418 A | 10/1987 | Okabe | |
| 4,811,561 A * | 3/1989 | Edwards et al. | 60/420 |
| 4,942,737 A * | 7/1990 | Tatsumi | 60/431 |
| 4,955,344 A * | 9/1990 | Tatsumi et al. | 123/352 |
| 5,468,126 A | 11/1995 | Lukich | |
| 5,960,695 A * | 10/1999 | Aardema et al. | 91/433 |
| 5,967,756 A | 10/1999 | Devier et al. | |
| 6,427,107 B1 | 7/2002 | Chiu et al. | |
| 6,748,738 B2 | 6/2004 | Smith | |
| 6,941,688 B2 * | 9/2005 | Ichimura et al. | 60/490 |

FOREIGN PATENT DOCUMENTS

| | | |
|---|---|---|
| EP | 0353799 | 2/1990 |
| EP | 1331383 | 7/2003 |
| EP | 1811155 | 7/2007 |
| JP | 61011429 | 1/1986 |
| JP | 04-119204 A | 4/1992 |
| JP | 07-166911 A | 6/1995 |
| JP | 09-273183 A | 10/1997 |
| JP | 10-252521 A | 9/1998 |
| JP | 11-210514 A | 8/1999 |
| JP | 2002-266379 A | 9/2002 |
| JP | 2004-190541 A | 7/2004 |

* cited by examiner

*Primary Examiner*—Thomas E Lazo
(74) *Attorney, Agent, or Firm*—Leydig, Voit & Mayer

(57) ABSTRACT

A method of controlling an electro-hydraulic system having an engine driving a variable displacement pump, a hydraulic valve and a hydraulic actuator in order to achieve more efficient engine operation is disclosed. The pressures in the electro-hydraulic system are monitored and commands are received indicating the desired movement of the hydraulic actuator. Based on the pressure and the commands, the operation being performed by the machine is determined and the engine is set to an efficient setting for the particular segment of machine operation.

20 Claims, 5 Drawing Sheets

FIG. 3

PROCESS FOR ELECTRO-HYDRAULIC CIRCUITS AND SYSTEMS INVOLVING EXCAVATOR BOOM-SWING POWER MANAGEMENT

TECHNICAL FIELD

This patent disclosure relates generally to electro-hydraulic power management, and, more particularly to a power management system and method to maximize engine efficiency and minimize work cycle times for a hydraulic machine.

BACKGROUND

Hydraulic machines, for example, hydraulic excavators, use engines to drive variable displacement pumps, which provide hydraulic power to cylinders. The engine often operates at a fixed high speed, regardless of the actual instantaneous power requirement of the machine. Thus, even when power demand is low, the engine runs at an inefficient high speed, resulting in higher than necessary fuel consumption and wear on the engine. However, when power demand is high, the engine is already running at a high speed and the necessary power can be delivered to the hydraulic system. Thus, the engine runs at an optimal speed for high power demand tasks, but runs at an inefficient speed for lower power demand tasks.

One exemplary hydraulic machine is a hydraulic excavator, which is useful for a number of tasks, which can be assessed as distinct steps. Excavators are often used to dig trenches. During a typical dig cycle, the excavator begins at the dig step by digging with its bucket into the soil. Next, during the lift and swing step, the excavator lifts the soil into the air and swings towards the dump location, for example a waiting dump truck. During the dump step, the machine dumps the soil at the dump location. Finally, during the return step the excavator swings back to the dig location, while lowering the bucket, and thus is ready for the next dig cycle. During the entirety of the dig cycle, the machine runs at maximum power. However, only the dig step and the lift and swing steps require high engine power. The dump and return steps require less power, but the machine typically runs at high power, thus unnecessarily consuming fuel.

Simple control schemes have been implemented to lower the engine speed of hydraulic machines and thus to conserve fuel during low power requirement operations. For example, engine speeds have been reduced to idle during sustained periods of waiting to conserve fuel. However, this control scheme does not vary the engine speed during active work cycles when less than full engine speed and hydraulic pump flow are required.

More sophisticated control schemes have been used to vary engine speed during an active work cycle. One exemplary method and apparatus for controlling engine speed during active work cycles is disclosed in U.S. Pat. No. 5,967,756 to Devier et al. The disclosed method varies the engine speed of a hydraulic machine based on the desired pump displacement and the desired engine speed. The engine speed is reduced to an efficient engine speed based on the desired pump displacement. While this method provides a more efficient machine, it does not optimize the efficiency of the machine based on the actual work being performed by the machine. Therefore, the disclosed method does not achieve the best optimizations.

The foregoing background discussion is intended solely to aid the reader. It is not intended to limit the invention, and thus should not be taken to indicate that any particular element of a prior system is unsuitable for use within the invention, nor is it intended to indicate that any element, including solving the motivating problem, is essential in implementing the innovations described herein. The implementations and application of the innovations described herein are defined by the appended claims.

BRIEF SUMMARY OF THE INVENTION

The disclosure describes, in one aspect, a method of efficiently operating an electro-hydraulic machine. The machine contains an engine that drives at least one variable displacement pump. The pump connects to at least one hydraulic actuator. An operator can control the engine speed by setting a dial to a desired engine speed. The system monitors the pressures in the electro-hydraulic system. Additionally, the system monitors command signals indicating the desired movement of the hydraulic actuator. Based on the pressures in the hydraulic system and the command signals indicating the desired movement of the hydraulic actuator, the system determines the current operation being performed by the machine. Finally, after determining the operation being performed, the engine is commanded to operate at an efficient speed for the particular operation.

In another aspect, a computer-readable medium is disclosed having computer executable instructions for controlling an electro-hydraulic system. The computer executable instructions include instructions for monitoring the pressures of the hydraulic system. The computer executable instructions further include instructions for receiving commands indicating the desired movement for at least one hydraulic actuator. The computer executable instructions further contain logical instructions that determine the operation being performed by the work machine based on the pressures of the hydraulic system and the commands indicating the desired movement for the at least one hydraulic actuator. Finally, the computer executable instructions contain instructions that cause the engine to operate at an efficient speed for the operation being performed.

DETAILED DESCRIPTION

This disclosure relates to a system and method for controlling the engine speed of an electro-hydraulic machine. The described technique includes monitoring the pressures in the hydraulic system and receiving commands indicating the desired movement of at least one hydraulic actuator in the system. Based on the pressures in the hydraulic system and the commands indicating the desired movement of the at least one hydraulic actuator, the current operation being performed by the machine is determined. The engine is then set to operate at an efficient speed based on the operation being performed.

Figure 1A:
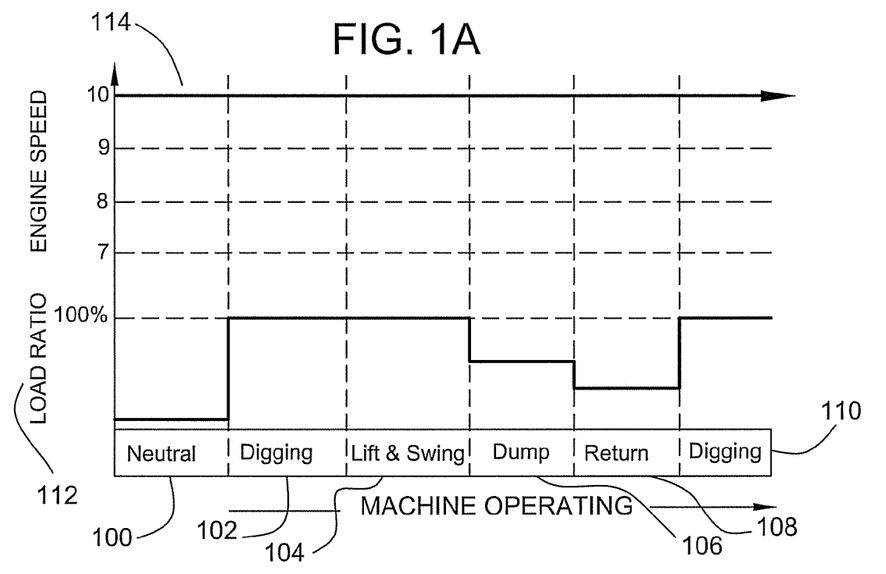
FIG. 1A is a graphical illustration of engine speed and load ratio versus an exemplary machine operating cycle where the engine speed is held constant.

Referring now to the drawings, FIG. 1A illustrates the load ratio of example operations performed by a machine, for example, an excavator. The operations include neutral 100. During the neutral operation 100, the machine is on and in a ready state but is not performing a specific task. The load ratio 112 of the hydraulic system is low during the neutral operation 100. However, the load ratio 112 of the hydraulic system during the neutral operation 100 may be non-zero. For example, the weight of the machine may have to be supported by the hydraulic system.

In the illustrated example, the next operation is digging 102. The digging operation 102 may include scooping soil or other material into a device such as a bucket. The device can be attached to the machine or it can be an integral part of the machine. During the digging operation 102, the load ratio 112 of the hydraulic system is high. FIG. 1A illustrates the load ratio 112 of the hydraulic system as 100% during the digging operation 102. However, the load ratio 112 can be less than 100%. For example, if the material being dug is light or not packed tightly, the load ratio 112 of the hydraulic system may be less than 100%.

In the example illustrated by FIG. 1A, the next operation is lift and swing 104. In this example, during lift and swing 104, the loaded device, such as a bucket, is lifted into the air and swung away from the dig site. In the illustrated example, the load ratio 112 of the hydraulic system is 100% during the lift and swing 104 operation. However, if the device is not fully loaded or if it is loaded with a light material, the load ratio 112 of the hydraulic system may be less than 100% during the lift and swing 104 operation.

After the lift and swing operation 104, the next illustrative operation is dump 106. The lift and swing operation positions the device containing the dug material to be emptied. The dump operation 106 empties the device containing dug material. The dump operation 106 illustrated in this example has an associated load ratio 112 of approximately 60%. However, the actual load ratio 112 of a dump operation can vary based on a number of factors, including the weight of the dug material and the weight of the machine.

If the machine is to perform another cycle, after the dump operation 106, the machine enters the return operation 108. However, if the machine is not performing another cycle, the machine may go directly to the neutral operation 100. In this example, during the return operation 108, the machine returns to the dig site so that the next digging operation 110 can begin. In this example, during the return operation 108, the load ratio 112 of the hydraulic system is 40%. The load ratio is dependant on a number of factors including the weight of the machine.

Thus, in this example, the machine performs cyclical work with each operation coming in a known order. However, in other embodiments, the machine does not perform cyclical work and machine operations can come in any order desired by an operator.

In the example illustrated in FIG. 1A, the engine speed 114 is held at a constant 10, which is the maximum allowable engine speed. However, in other embodiments, such as the embodiment illustrated in FIG. 1B, the engine speed varies with the operation performed by the machine. In the embodiment illustrated in FIG. 1B, the engine speed 116 defaults to 10, the maximum allowed engine speed. Thus during the neutral cycle 100, the engine speed 116 is set to 10. The default engine speed can be any appropriate value. For example, the engine may default to a speed of 9, 8, 7, 6, 5 and so on. Additionally, the operator of the machine may be able to select the default speed.

After the neutral operation 100, the machine enters the digging operation 102. During the digging operation 102, the load ratio 112 is high. Therefore, the system sets the engine speed 116 to a high value. In this example, the engine speed 116 is set to maximum, or 10. In the illustrated example, the next operation is lift and swing 104. During lift and swing, the load ratio 112 is high. Based on the high load ratio, the system sets the engine speed 116 to a high value. The next example operation is dump 106. During dump, the load ratio 112 of the hydraulic system is reduced to approximately 60%. Therefore, when the machine enters the dump operation 106, the engine speed 116 is reduced. In the example illustrated in FIG. 1B, the system reduces the engine speed 116 from maximum or 10, to a lower value, 8, during the dump operation 106. However, any appropriate reduced value may be used. In some systems a reduced value of 9, 8, 7, 6, 5 and so on may be appropriate.

Figure 1B:
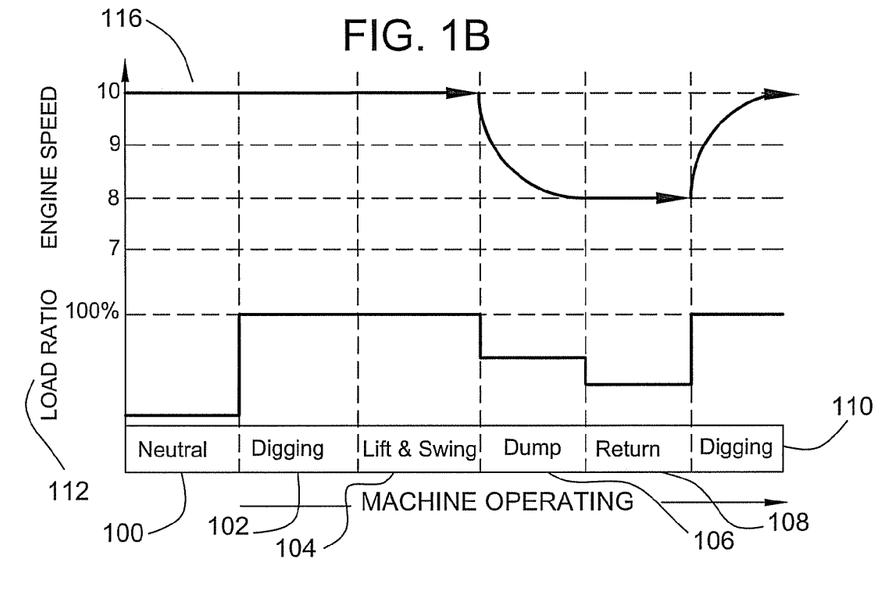
FIG. 1B is a graphical illustration of engine speed and load ratio versus an exemplary machine operating cycle where the engine speed is reduced to a lower speed during lower load ratio segments of the machine operating cycle.

After the dump operation 106, the machine enters the return operation 108. During the return operation 108, the load ratio 112 of the hydraulic system is low. In this example, the load ratio 112 is approximately 40%. Therefore, in the illustrated example, the system sets the engine speed 116 to a value of 8 during the return operation 108. However, any appropriate reduced engine speed 116 value may be used. In the example, after the return operation 108, the machine enters the dig operation 110. As discussed above, the load ratio 112 during the dig operation 110 is high. Therefore, the system sets the engine speed 116 to a high value during the dig operation 110.

Figure 1C:
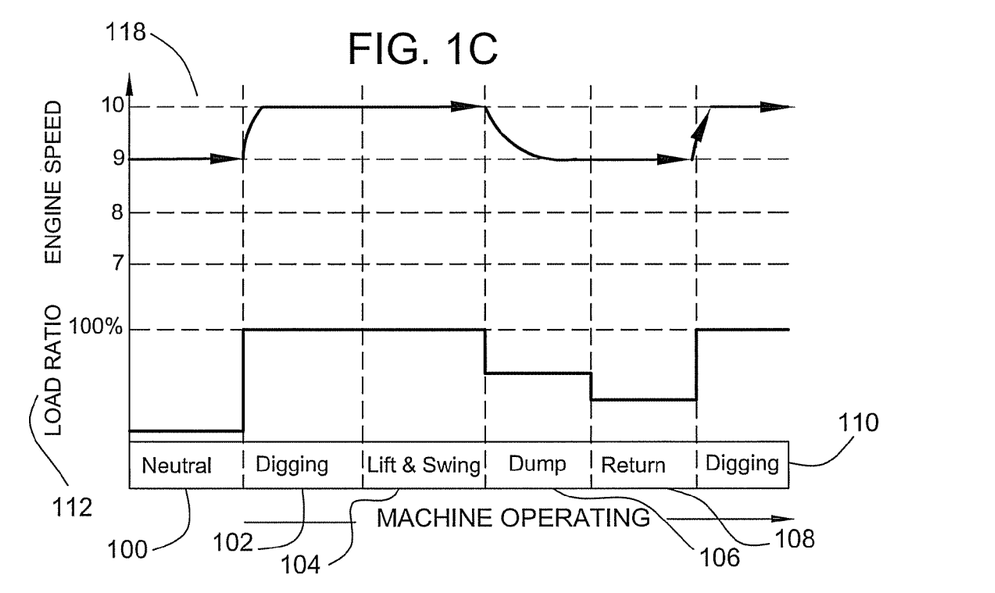
FIG. 1C is a graphical illustration of engine speed and load ratio versus an exemplary machine operating cycle where the engine speed is increased to a higher speed during higher load ratio segments of the machine operating cycle.

FIG. 1C illustrates an example embodiment where the engine speed defaults to a low value and is increased during high load ratio 112 operations. For example, during the neutral operation 100, the load ratio 112 is low. The system sets the engine speed 118 to the default value. In this example, the default value of the engine speed 118 is 9. The dig operation 102 results in a high load ratio 112 for the hydraulic system. Therefore, the system sets the engine speed 118 to a high value, 10, during the dig operation 102. Similarly, the lift and swing operation 104 results in a high load ratio 112 for the hydraulic system. Therefore, the system maintains the high engine speed 118 that was set during the digging operation. As discussed above, the dump operation 106 results in a lower load ratio 112. Therefore, in the example illustrated in FIG. 1C, the system reduces the engine speed 118 to a value of 9, during the dump operation 106. The return operation 108 also had a low load ratio 112. The system sets the engine speed 118 to a low value, 9 during the return operation 106. After the return operation 106, the system enters the next cycle and the dig operation 110 begins. During the dig operation 110 the load ratio 112 in the hydraulic system is high and the engine speed 118 is increased.

Figure 1D:
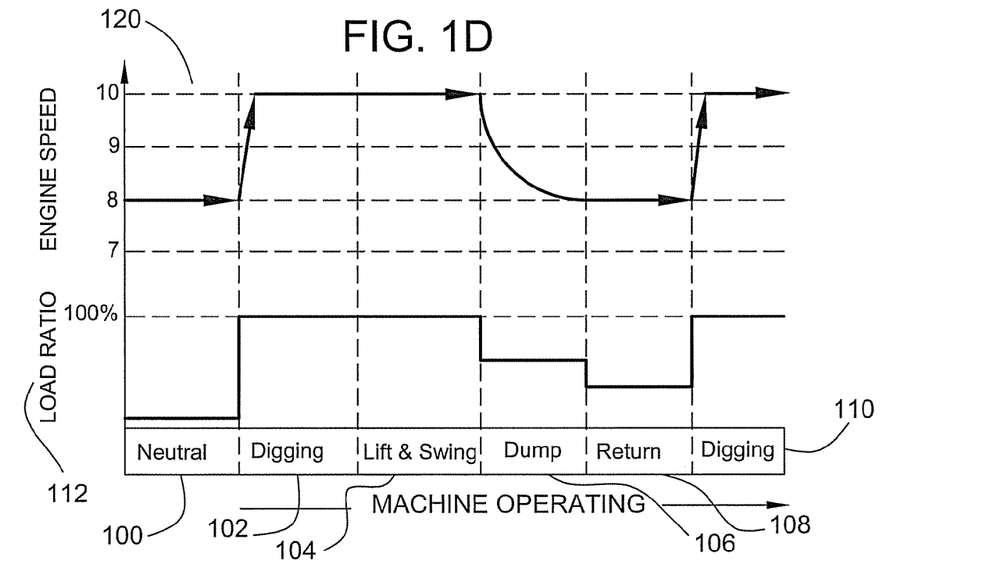
FIG. 1D is an alternative graphical illustration of engine speed and load ratio versus an exemplary machine operating cycle where the engine speed is increased to a higher speed during higher load ratio segments of the machine operating cycle, however, the engine speed during lower load ratio segments is set at a lower value than the engine speed of comparable segments in FIG. 1C.

In the example illustrated in FIG. 1C, the default engine speed 118 has a value of 9. An engine speed setting of 9 can result in various engine RPMs based on the particular machine. FIG. 1D illustrates a system similar to FIG. 1C, except the engine speed 120 default value is set to 8. For example, during the neutral operation 100, the load ratio 112 is low and the engine speed 120 is set to the default value of 8. During the digging operation 102, the load ratio is high, and the engine speed 120 is set to the maximum value, 10. Similarly, during the lift and swing operation 104, the load ratio 112 remains high and the engine speed 120 therefore remains at the maximum value, 10. During the dump operation 106, the load ratio drops to approximately 60%. Therefore the engine speed 120 is reduced from the maximum value to a lower default value of 8. The engine speed 120 remains at the default value of 8 during the return operation 108. Finally, the machine begins the next cycle with the digging operation 110.

The default value can vary depending on the task and the machine. A higher default value may result in a slight increase in productivity because the machine may be able to complete certain operations more quickly. For example, the return operation 108 in FIG. 1C uses an engine speed 118 of 9 while the return operation 108 in FIG. 1D uses an engine speed 120 of 8. The return operation in FIG. 1C might be completed more quickly than the return operation in FIG. 1D. However, the implementation illustrated in FIG. 1C may use more fuel than the implementation illustrated in FIG. 1D because FIG. 1C maintains a higher engine speed 118. In some embodiments, the operator selects the default minimum engine speed and may even override the system, forcing the machine to always operate at a particular speed, as illustrated in FIG. 1A. In other embodiments, the user cannot set the default engine speed. Ways of setting the default engine speed include setting the speed at the factory or determining the speed algorithmically based on the work being accomplished.

Based on the task being performed and the default engine speed value, an efficient engine speed is determined. As used hereinafter, an efficient engine speed varies the amount of fuel used by the machine and the time to accomplish a work cycle. The system may bias the efficient engine speed towards fuel efficiency or towards work cycle time as needed. For example, the system illustrated in FIG. 1C maintains an efficient engine speed of at least 9, while the system illustrated in FIG. 1D maintains an efficient engine speed of at least 8. Therefore, the system illustrated in FIG. 1C may be calibrated to emphasize cycle times over fuel efficiency, while still achieving fuel efficiency gains over the steady state engine speed illustrated in FIG. 1A. The system illustrated in FIG. 1D may be calibrated to emphasize fuel efficiency over cycle times, while still providing the user with a responsive machine. Additionally, in some embodiments, the operator can vary the relationship between fuel efficiency and cycle times in order to achieve an efficient engine speed suited to the particular operator needs.

Figure 2:
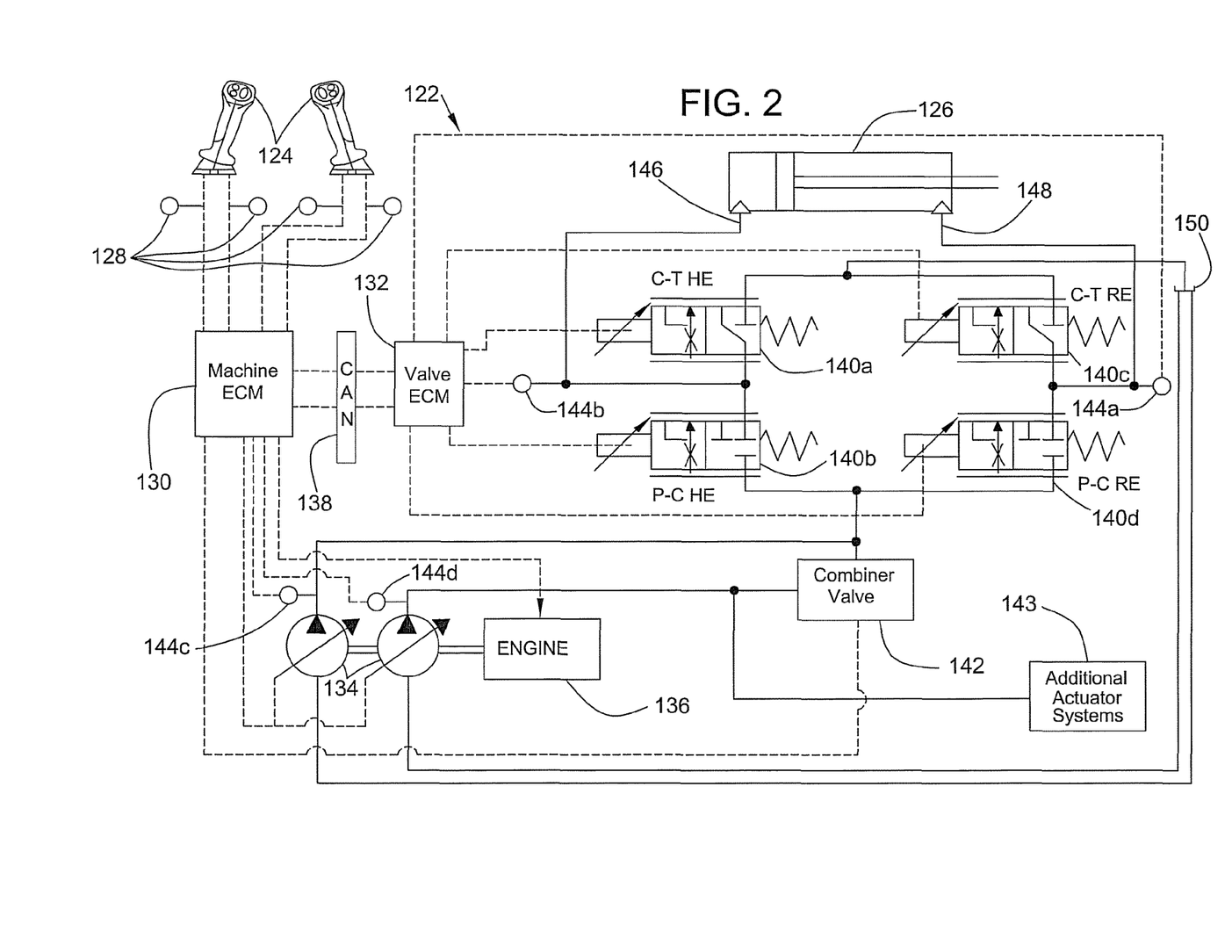
FIG. 2 is a schematic view of an electro-hydraulic system for a machine.

FIG. 2 illustrates an example electro-hydraulic control system 122 for a machine, although various control systems are suitable for electro hydraulic machines. The control system 122 includes devices, such as the illustrated joysticks 124, for indicating a desired movement of at least one hydraulic actuator 126. Sensors 128 detect movement of the joysticks 124 and send data related to the joystick 124 movement to the machine electronic control module (ECM) 130. Based on the desired movement data, the machine ECM 130 generates commands for the valve ECM 132, the variable displacement pumps 134 and the engine 136. The output from the variable displacements pumps 134 can be combined at the combiner valve 142. Alternatively, the output from the variable displacements pumps 134 can be sent to additional actuator systems 143.

The valve ECM 132 communicates with the machine ECM 130 using any appropriate communications mechanism. In the illustrated example, a CAN bus 138 is utilized to pass information between the machine ECM 130 and the valve ECM 132. There can be any number of electronic control modules, each responsible for executing software code for the machine. In the illustrated example, two electronic control modules are depicted, but any number of control modules can be used including one. The machine ECM 130, as noted above, controls the pumps 134, engine 136 and valve ECM 132. The valve ECM 132 generates commands for the metering elements 140*a*, 104*b*, 140*c* and 140*d* that control the flow of hydraulic fluid in the system. However, in alternative embodiments, there can be any number of metering valves. Additionally, the valve ECM monitors pressures in the hydraulic system using sensors 144*a* and 144*b*. The machine ECM monitors the pressures in the hydraulic system using sensors 144*c* and 144*d*. The machine ECM monitors pump sensors. The machine ECM 130 and valve ECM 132 share sensor information as necessary and can access the CAN bus 138 if needed. Each electronic control module can be implemented separately. Example architectures appropriate for implementing an electronic control module include general purpose processors, application specific integrated circuits and programmable logic devices.

Using the joysticks 124, an operator can control the electro-hydraulic system of the machine. FIG. 2 depicts one hydraulic actuator 126. However, multiple hydraulic actuators can be implemented on a single machine to accomplish a task. Using the joysticks 124, an operator can indicate that the hydraulic actuator 126 should extend. For example, looking at FIG. 1D, going from the neutral cycle 100 to the digging cycle 102 may require one or more hydraulic actuators to extend while at the same time increasing engine speed from dial 8 to dial 10. In order to accomplish this task, the user operates the joysticks 124. The joystick sensors 128 sense the joystick 124 movement and transmit the information to the machine ECM 130. The machine ECM 130 also obtains pressure data from the valve ECM 132, which monitors pressure sensors 144*a* and 144*b* and pump pressure sensors if needed. Based on increasing pressures in the hydraulic system and the joystick 124 movement, the machine ECM recognizes that the machine is entering a new cycle, for example the dig cycle 102.

In response to entering the dig cycle 102, the machine ECM transmits a message to the engine 136 to increase its speed. Hence, in this example, the engine enters speed 10. The machine ECM 130 also transmits a command to the variable displacement pumps 134 to displacement to an appropriate value. Finally, the machine ECM 130 transmits a command through the CAN bus 138 to the valve ECM 132 indicating that the hydraulic actuator 126 should expand or retract. In response to the command from the machine ECM 130, the valve ECM 132 opens the head end valve P-C HE 140*b*. The valve ECM 132 also keeps closed the rod end valve 140*d* and head end valve 140*a* and opens rod end valve 140*c*. Therefore, the output of the pumps 134 can be combined at the combiner valve 142 and goes through valve P-C HE 140*b*, then to the head end 146 of the hydraulic cylinder 126, and the flow of the rod end side of the cylinder goes to the tank 150. Hence, the hydraulic actuator expands. This represents one exemplary mode of valve operation.

When entering the next cycle, for example the dump cycle 106, the user indicates the desired movement of the machine using the joysticks 124. The movement of the joysticks 124 is detected by the sensors 128. The sensors 128 transmit the movement to the machine ECM 130. The machine ECM 130 recognizes that the machine is entering the dump cycle. Therefore, the machine ECM 130 transmits a message to the engine 136 to decrease its speed. Hence in this example, the engine enters speed 8. The machine ECM 130 also transmits a command to the variable displacement pumps 134 to decrease their displacement. The machine ECM 130 also transmits a command through the CAN bus 138 to the valve ECM 132 indicating the appropriate motion of the hydraulic actuator 126.

The example electro-hydraulic system supports regeneration. Therefore, when the hydraulic actuator 126 is retracting, fluid from the head end 146 can pass to the rod end 148 through the head end valve 140b to the rod end valve 140d, rather than going directly to the repository 150. For example, fluid can flow from the head end 146 of the actuator 126, through the P-C HE valve 140b, through the valve P-C RE 140d and then to the rod end 148 of the actuator 126. Using regeneration requires less flow from the pumps 134. Therefore, less power is used by the pumps and the engine 136 can operate more efficiently while saving fuel.

Figure 3:
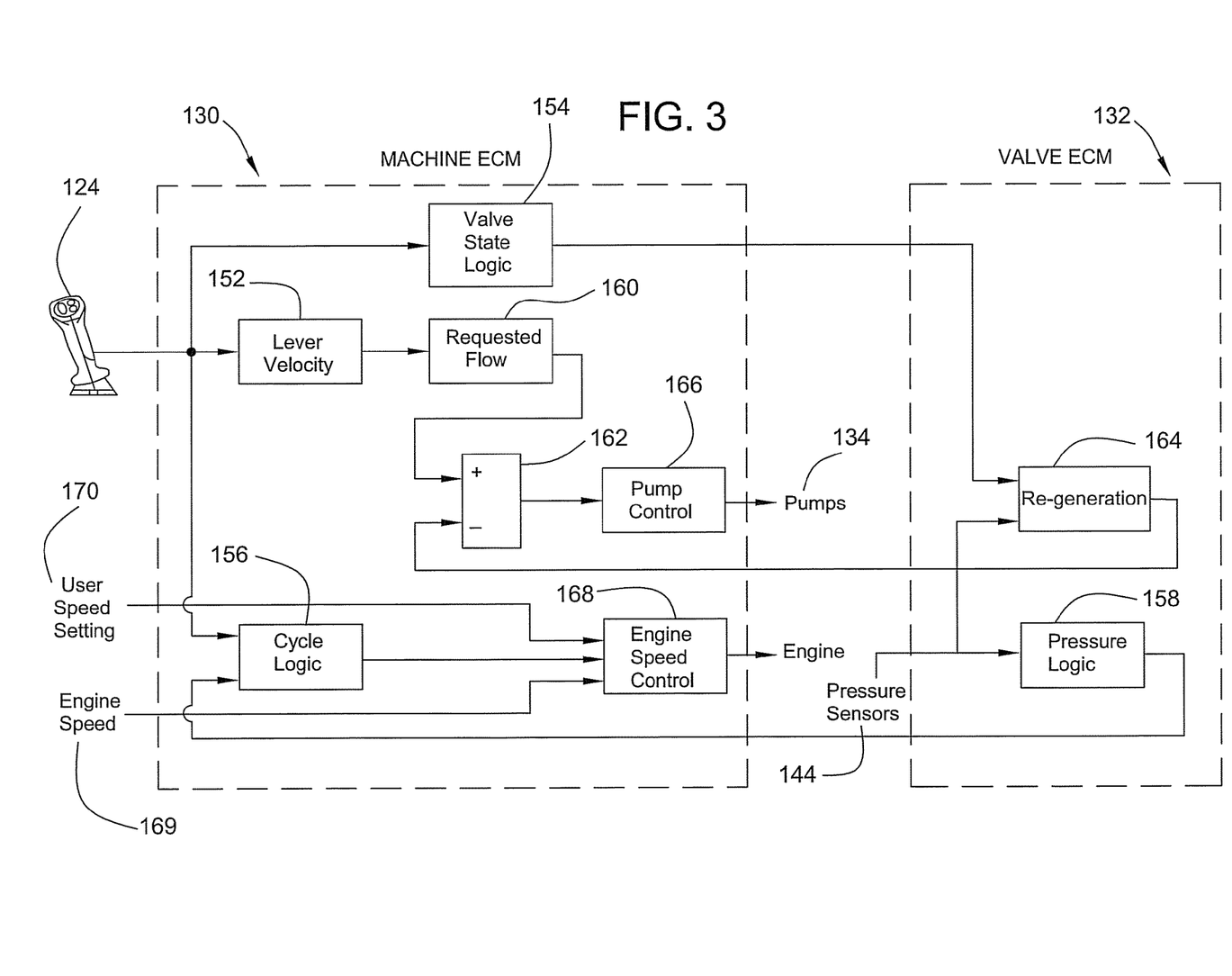
FIG. 3 is a logical block diagram of a control system for a electro-hydraulic system for a machine.

FIG. 3 illustrates a logical block diagram of a control system for an electro-hydraulic system for a machine. An operator uses joystick 124 to input directional commands to the system. The lever velocity stage 152 within the machine ECM 130 determines the direction of the desired actuator movement and calculates the desired velocity for the movement based on the position of the joystick 124. The joystick 124 position also feeds the valve state logic stage 154. The valve state logic determines whether the head end valves 140a, 140b and the rod end valves 140c and 140d should be opened or closed to achieve the desired movement of the hydraulic actuator. Additionally, the joystick 124 position feeds the cycle logic stage 156. The cycle logic 156 determines which cycle of operation the machine is performing. For example, based on the task being accomplished by the machine in FIG. 1, the cycles are neutral 100, digging 102, lift and swing 104, dump 106, return 108 and digging 110. In order to determine the cycle, the cycle logic 156 also receives data from the pressure sensors 144 from the pressure logic stage 158. The pressure logic 158 is located within the valve ECM 132.

The lever velocity stage 152 passes the requested movement information from the joystick 124 to the requested flow stage 160. The requested flow stage 160 determines the amount of hydraulic fluid necessary to move the hydraulic actuator at the desired velocity and passes the required flow signal to the summation stage 162. The summation stage 162 receives regeneration information from the regeneration stage 164 in the valve ECM 132. The summation stage 162 subtracts the hydraulic flow obtained through regeneration from the required amount of hydraulic flow calculated by the requested flow stage 160. The necessary flow signal is sent from the summation stage 162 to the pump control stage 166. The pump control stage 166 calculates the necessary pump displacement and passes the value to the variable displacement pumps 134.

The engine speed is calculated by the engine speed control stage 168. The engine speed control stage 168 calculates the correct engine speed based on the cycle of the machine, which is calculated by the cycle logic 156 and the current engine speed 169. In this example, the engine speed control stage 168 also accepts the user speed setting 170. The user speed control 170 can be used to override the calculated engine speed. Additionally, the user speed control 170 can be used to set the base speed of the engine. For example, in FIG. 1C, the base speed of the engine is 9, which can be seen during the neutral cycle 100. In FIG. 1D, the base speed of the engine is 8, which can also be seen during the neutral cycle 100.

Figure 4:
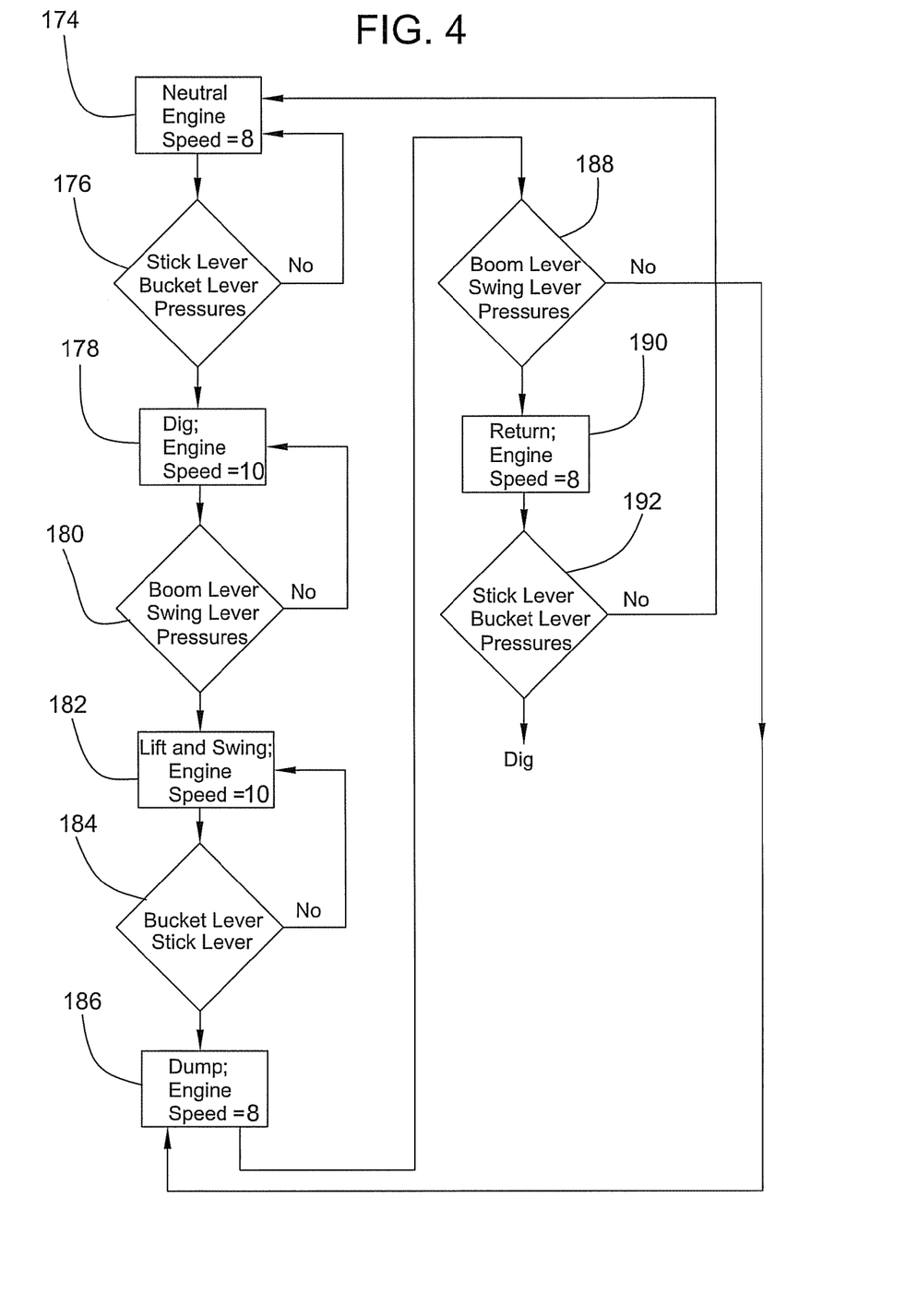
FIG. 4 is a flow chart illustrating the process illustrated in FIG. 1D for controlling the engine speed of an electro-hydraulic machine.

FIG. 4 is a flow chart illustrating an example process for controlling the engine speed of an electro-hydraulic machine as depicted in FIG. 1D. The exemplary process begins with the machine it the neutral stage 174 with the engine speed at 8. However, the exemplary process can be initiated with the machine in any cycle. Decision point 176 determines if the stick and bucket levers have moved such that the machine is entering the dig cycle 102. Additionally, decision point 176 monitors the pressure sensors to determine if the pressures in the hydraulic system are increasing. If the machine is not entering the dig cycle 102, the process remains in the neutral stage 174. If the machine is entering the dig cycle 102, the process moves to the dig stage 178. During the dig stage 178, the engine speed is set to 10. Increasing the engine speed allows the hydraulic system to utilize more power to dig. At decision point 180, the system monitors the boom lever and the swing lever to determine if the boom is lifting away from the ground and swinging away from the dig site. The system also monitors the pressure sensors including sensors related to boom, swing, and the bucket to determine if pressures in the hydraulic system is high, indicating the boom is lifting and the dig cycle has ended. If the system determines the boom is lifting and swinging away from the dig site, the system enters the lift and swing stage 182, otherwise the system remains in the dig stage 178. After entering the lift and swing stage 182, the engine speed remains at 10. The process next monitors the bucket and stick levers at decision point 184. If the bucket lever and stick lever indicates that the system is dumping the bucket, the system enters dump stage 186, otherwise the system remains in the lift and swing stage 182.

During the dump stage 186, the system reduces the engine speed to 8 in order to conserve energy during the low hydraulic demand operation. At decision point 188, the system monitors the boom lever, swing lever and system pressures. If the machine begins to swing away from the dump site, the system enters the return stage 190, otherwise the system remains in the dump cycle. During the return stage 190, the system sets the engine speed to 8 to conserve fuel. Finally, at decision point 192, the system monitors the stick lever, bucket lever and hydraulic system pressures. If the stick lever and bucket lever drop and the pressures increase, the system enters the dig stage 178. If the stick lever and bucket lever cease movement and the pressures remain low, the system enters the neutral stage 174. The exemplary process illustrated in FIG. 4 shows one possible method for implementing one possible task for one machine. Many processes can be implemented to accomplish a variety of tasks for a variety of machines. The process shown in FIG. 4 is provided for illustrative purposes and is not intended to limit the disclosure.

INDUSTRIAL APPLICABILITY

The industrial applicability of the process for electro-hydraulic circuits and systems involving excavator power management described herein will be readily appreciated from the foregoing discussion. The present disclosure is applicable to many machines and many tasks accomplished by machines. One exemplary machine suited to the disclosure is an excavator. Excavators are electro-hydraulic machines that often dig in soil. The exemplary method provided in FIG. 4 illustrates one method of implementing the process on an excavator tasked with digging. It should be reiterated that the foregoing discussion applies to many machines accomplishing a variety of tasks.

An excavator has multiple joysticks controlled by an operator. Using the described methods, the excavator monitors the movement of the joysticks and the pressures in the electro-hydraulic system. If the joysticks indicate that a power intensive task is to be accomplished and the pressures in the hydraulic system begin to increase, the excavator increases engine power. Increasing engine power uses additional fuel and therefore the machine is more productive when needed, but more costly to run. Engine power is likewise reduced when the movement of the joysticks indicates that a lower power intensive task is to be accomplished and the pressures in the hydraulic system begin to drop, and therefore the fuel efficiency of the machine is improved.

Similarly, the methods and systems described above can be adapted to a large variety of machines and tasks. For example, backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of controlling an electro-hydraulic system having an engine that drives at least one variable displacement pump connected to at least one hydraulic actuator, comprising the steps of:
    operating the engine at a first predetermined speed;
    monitoring the pressures in the electro-hydraulic system;
    receiving at least one command indicating a desired movement for the at least one hydraulic actuator;
    determining the operation being performed by the electro-hydraulic system in response to the pressures in the electro-hydraulic system and the at least one command indicating the desired movement for the at least one hydraulic actuator;
    causing the engine to operate at an efficient speed in response to the operation being performed.

2. The method of claim 1 further comprising the step of maintaining at least a predetermined minimum engine speed.

3. The method of claim 2 further comprising the step of setting with a user input device the predetermined minimum engine speed.

4. The method of claim 1, wherein monitoring the pressures in the electro-hydraulic system further includes: measuring the pressure of the at least one variable displacement pump driving the hydraulic system.

5. The method of claim 1, wherein monitoring the pressures in the electro-hydraulic system further includes:
    measuring the hydraulic pressure of at least one of the metering valve or the hydraulic actuator.

6. The method of claim 1, wherein causing the engine to operate at an efficient speed further includes:
    responding to an engine speed control user selection device.

7. The method of claim 1 further comprising the step of monitoring at least one of the engine speed and the engine torque.

8. The method of claim 1, wherein determining the operation being performed includes executing computer instructions on a first electronic control module and executing additional computer instructions on a second electronic control module.

9. A non-transitory computer readable medium having computer-executable instructions for controlling an electro-hydraulic system having an engine that drives at least one variable displacement pump connected to at least one hydraulic actuator, the computer-executable instructions comprising:
    instructions for operating the engine at a first predetermined speed;
    instructions for monitoring the pressures in the electro-hydraulic system;
    instructions for receiving at least one command indicating a desired movement for the at least one hydraulic actuator;
    instructions for determining the operation being performed by the electro-hydraulic system in response to the pressures in the electro-hydraulic system and the at least one command indicating the desired movement for the at least one hydraulic actuator;
    instructions for causing the engine to operate at an efficient speed in response to the operation being performed.

10. The non-transitory computer-readable medium according to claim 9, further comprising instructions for maintaining at least a predetermined minimum engine speed.

11. The non-transitory computer-readable medium according to claim 10 further comprising instructions for allowing a user to set with a user input device the predetermined minimum engine speed.

12. The non-transitory computer-readable medium according to claim 9, wherein the instructions for monitoring the pressures in the electro-hydraulic system including instructions for measuring the pressure of the at least one variable displacement pump driving the hydraulic system.

13. The non-transitory computer-readable medium according to claim 9, wherein the instructions for monitoring the pressures in the electro-hydraulic system further includes instructions for measuring the hydraulic pressure of at least one of the metering valve or the hydraulic actuator.

14. The non-transitory computer-readable medium according to claim 9, wherein causing the engine to operate at an efficient speed further includes instructions for responding to an engine speed control user selection device.

15. The non-transitory computer-readable medium according to claim 9, wherein the first predetermined speed is determined automatically.

16. An electro-hydraulic machine comprising:
    at least one user input device;
    at least one hydraulic actuator connected to a variable displacement pump through at least one metering valve;

an engine connected to the at least one variable displacement pump;

at least one control module connected to the at least one variable displacement pump, the engine and the at least one metering valve;

a non-transitory computer-readable memory electronically accessible to the at least one control module and having computer-executable instructions for operating the engine at a first predetermined speed, monitoring the pressures in the electro-hydraulic system, receiving at least one command indicating a desired movement for the at least one hydraulic actuator, determining the operation being performed by the electro-hydraulic system in response to the pressures in the electro-hydraulic system and the at least one command indicating the desired movement for the at least one hydraulic actuator, causing the engine to operate at an efficient speed in response to the operation being performed.

17. The electro-hydraulic machine according to claim 16 further comprising a first control module and a second control module;

the first control module interfacing with the variable displacement pumps and the engine;
the second control module interfacing with the independent metering valves;
the first control module and the second control module interfacing with each other using a bus.

18. The electro-hydraulic machine according to claim 16 wherein the non-transitory computer-readable memory electronically is integrated into the at least one control module.

19. The electro-hydraulic machine according to claim 16 wherein the non-transitory computer-readable memory contains instructions for receiving a user input overriding the efficient speed.

20. The electro-hydraulic machine according to claim 16 further comprising a regeneration valve system.

* * * * *